United States Patent
Al-Bahar et al.

(10) Patent No.: US 9,340,456 B2
(45) Date of Patent: May 17, 2016

(54) PROCESS USING MULTIPLE WASTE STREAMS TO MANUFACTURE SYNTHETIC LIGHTWEIGHT AGGREGATE

(71) Applicant: KUWAIT INSTITUTE FOR SCIENTIFIC RESEARCH, Safat (KW)

(72) Inventors: Suad Al-Bahar, Mangaf (KW); Saud Al-Otaibi, Mangaf (KW); Sharifa Al-Fadala, Adailiya (KW); Ali Abduljaleel, Salmiya (KW); Mahmoud Fawzy Taha, Hawally (KW); Fatma Al-Fahad, Safat (KW); Amer Al-Arbeid, Jabriya (KW); Tarun K. Mukherjee, Salmiya (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 129 days.

(21) Appl. No.: 14/464,689

(22) Filed: Aug. 20, 2014

(65) Prior Publication Data

US 2016/0052823 A1  Feb. 25, 2016

(51) Int. Cl.
*C04B 14/10* (2006.01)
*C04B 14/30* (2006.01)

(52) U.S. Cl.
CPC ............... *C04B 14/10* (2013.01); *C04B 14/303* (2013.01); *C04B 14/304* (2013.01); *C04B 14/305* (2013.01); *C04B 14/308* (2013.01)

(58) Field of Classification Search
CPC ...................................................... C04B 14/10
See application file for complete search history.

(56) References Cited

U.S. PATENT DOCUMENTS

| | | | |
|---|---|---|---|
| 3,030,222 A | 4/1962 | Eichenlaub |
| 3,847,634 A | 11/1974 | Vickery |
| 5,342,442 A | 8/1994 | Nechvatal et al. |
| 5,762,864 A | 6/1998 | Park |
| 6,068,759 A | 5/2000 | Moore et al. |
| 8,298,330 B2 | 10/2012 | Forth et al. |

FOREIGN PATENT DOCUMENTS

JP  2-283678  11/1990

OTHER PUBLICATIONS

"Production of lightweight aggregates from mining and industrial wastes", Gonzalez-Corrochano et al., Journal of Environmental Management, Apr. 21, 2009.
B. Gonzalez-Corrochano et al., "Microstructure and mineralogy of lightweight aggregates produced from washing aggregate sludge, fly ash and used motor oil", Cement and Concrete Composites, vol. 32, Iss. 9 (2010), pp. 694-707.

(Continued)

*Primary Examiner* — Paul Marcantoni
(74) *Attorney, Agent, or Firm* — Richard C. Litman

(57) ABSTRACT

The process using multiple waste streams to manufacture synthetic lightweight aggregate includes providing a mixture of aggregate wash and at least one of another waste stream, such as waste lube oil or sewage sludge. The mixture is formed into pellets and subjected to various firing stages and temperatures in which the calcination and subsequent bloating occurs. The mixture can also be added to natural clays to form corresponding pellets. The bloating promotes formation of porous cavities, and once cooled, the pellets form lightweight, low density synthetic aggregates suitable for use as building materials, thermal insulators, and the like.

16 Claims, 6 Drawing Sheets

(56) References Cited

OTHER PUBLICATIONS

"Heavy metal chemical fractionation and immobilization in lightweight aggregates produced from mining and industrial wastes", Gonzalez-Corrochano et al., International Journal of Environmental Science and Technology, 8 (4), 667-676, Sep. 1, 2011.

"Sequential Extraction for Evaluating the Behaviour of Selected Chemical Elements in Light weight Aggregates Manufactured From Mining and Industrial Wastes", Gonzalez-Corrochano et al., International Journal of Environmental Research, 7(3): 539-550, Summer 2013.

PROCESS USING MULTIPLE WASTE STREAMS TO MANUFACTURE SYNTHETIC LIGHTWEIGHT AGGREGATE

BACKGROUND OF THE INVENTION

1. Field of the Invention

The present invention relates to building materials, and particularly to a process using multiple waste streams to manufacture synthetic lightweight aggregate that can be used to make concrete and other building materials.

2. Description of the Related Art

The construction industry is very demanding on natural raw materials, especially concrete. Concrete production consumes vast quantities of aggregates. Such consumption can negatively impact the growth of local economies and infrastructures that rely on these aggregates to help sustain these endeavors by building new structures for business and personal property and maintenance on existing roads and buildings. Even more unfortunate, some areas of the world have scarce local aggregate sources to adequately support such activities. For example, Kuwait, a strong oil-based economic nation, has completely stopped quarrying for coarse aggregates. The construction industry there is now entirely dependent on imported aggregates from neighboring countries. Therefore, there is a need for alternative sources.

Manufactured or synthetic aggregates are examples of some substitutes for natural aggregates, especially as lightweight aggregates, hereinafter referred to as LWAs. Synthetic aggregates are usually characterized by their low density. According to ASTM specifications (C 330-05, 1989; C 331-05, 1994; and C 332-05, 1994), the bulk density of lightweight aggregates used in structural concrete, heat-insulating concrete, and concrete masonry units should be in the range of 0.88 to 1.12 $g/cm^3$.

Synthetic aggregates are generally produced from a number of raw materials including clay, shale, slate, perlite, vermiculite, blast furnace slag, and pulverized fuel ash. The production of synthetic aggregate from clay involves heating suitable raw materials at a sufficiently high temperature so that it melts to a viscous, pyroplastic mass. The entrapped gases in the viscous mass cause expansion or bloating of the mass, and subsequently results in a porous structure with low density upon cooling.

Studies by Riley (1951) have shown that the chemical composition of unfired raw material indicates whether or not it can develop the proper viscosity at the melting point needed for gas entrapment, and thus reduce bloating. His research showed experimentally that the viscosity requirement can be satisfied if the chemical composition of the raw material is such that there is a proper ratio of fluxing oxides (CaO, MgO, FeO, $Fe_2O_3$, $Na_2O$ and $K_2O$) to silica ($SiO_2$) and alumina ($Al_2O_3$). The compositional relationship for satisfying the viscosity requirement in clays is demonstrated in a Riley triangle or diagram, an example of which is shown in FIG. 1.

One example of a synthetic aggregate involves mixtures of marine clay and $CaF_2$-rich semiconductor-industry sludge in several clay-to-sludge ratios or loadings, namely 90/10, 70/30 and 50/50. The mixtures were fired in a bench-scale rotary kiln. The results produced synthetic aggregates that exhibited good bloating during firing and low densities, as required for LWAs.

When clay is used to produce synthetic aggregate, a suitable raw material is heated to a sufficiently high temperature to melt it into a viscous, pyroplastic mass. The entrapped gases in the viscous mass cause the expansion or bloating of the mass, and subsequently, a porous structure with low density results upon cooling. Some basic requirements for raw material to be used in synthetic aggregate production are: the raw materials should melt at a temperature not exceeding 1300° C.; the raw materials should contain sufficient gas-forming ingredients for bloating, and the gases should be evolved at the temperature at which melting occurs; and the viscosity of the melt should neither be too high nor too low (a viscosity that is too high results in thick wall formation in the finished product, whereas a viscosity that is too low results in insufficient bloating).

The melting temperature is mainly controlled by the mineralogical composition of the raw material. When clay is subjected to heat treatment, liquefaction starts with the melting of minerals requiring the lowest temperature. Once such minerals begin to melt, they act as a fluxing or dissolving agent and tend to lower the melting point of the minerals in contact with them. Some low-temperature fluxing minerals include sodium and potassium salts, and silicates. Feldspar provides fluxing action over a wide range of temperatures.

The constituents necessary for gas evolution at a temperature coincident with the molten state are reported to be pyrite, hematite, and dolomite. The various gases generated from these minerals or other sources that bloat the viscous mass include oxygen, sulfur dioxide, sulfur trioxide, carbon monoxide and entrapped air. The evolution of oxygen from the dissociation of ferric oxide at high temperatures is considered to be very significant in the bloating of clays.

While the above is exemplary of a viable synthetic aggregate composition, the above utilizes only one source of waste. Moreover, it is highly specific to a small number of industries, i.e., the semiconductor industry, and as a corollary, in some instances, to a specific region. Many industrialized economies and nations worldwide exist that have limited natural resources and several streams of wastes. In light of the above, it would be a benefit to the construction industry to develop a process for producing a synthetic aggregate that can incorporate a plurality of waste sources in the composition thereof with similar performance to natural aggregates. Such a process allows for recycling of waste, which will assist in substantially reducing the environmental impact while meeting aggregate demands.

Thus, a process using multiple waste streams to manufacture synthetic lightweight aggregate solving the aforementioned problems is desired.

SUMMARY OF THE INVENTION

The process using multiple waste streams to manufacture synthetic lightweight aggregate includes providing a mixture of aggregate wash and at least one other waste stream, such as waste lube oil or sewage sludge. The mixture is formed into pellets and subjected to various firing stages and temperatures in which calcination and subsequent bloating occurs. The mixture can also be added to natural clays to form corresponding pellets. The bloating promotes formation of porous cavities, and once cooled, the pellets form lightweight, low-density synthetic aggregates suitable for use as building materials, thermal insulators, and the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
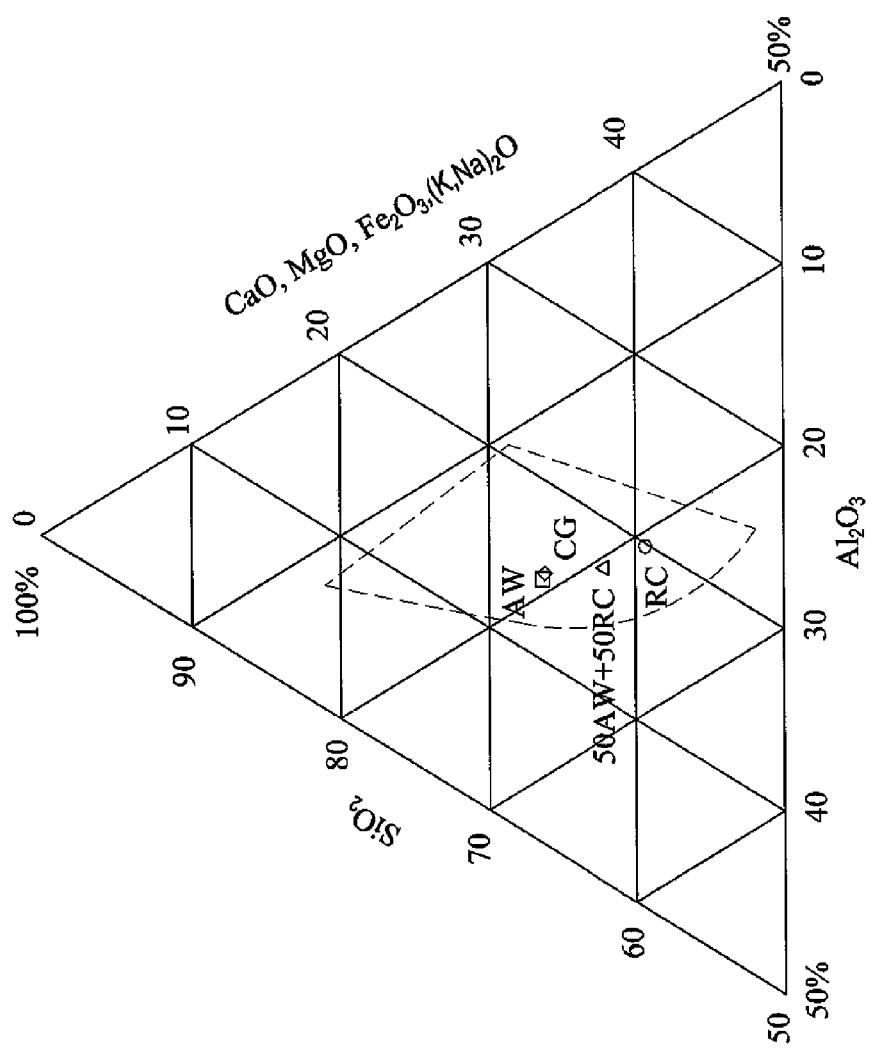
FIG. 1 is a Riley composition diagram of raw materials and mixtures in a process using multiple waste streams to manufacture synthetic lightweight aggregate according to the present invention and use of the positions thereof in determining bloatability.
Figure 2A:
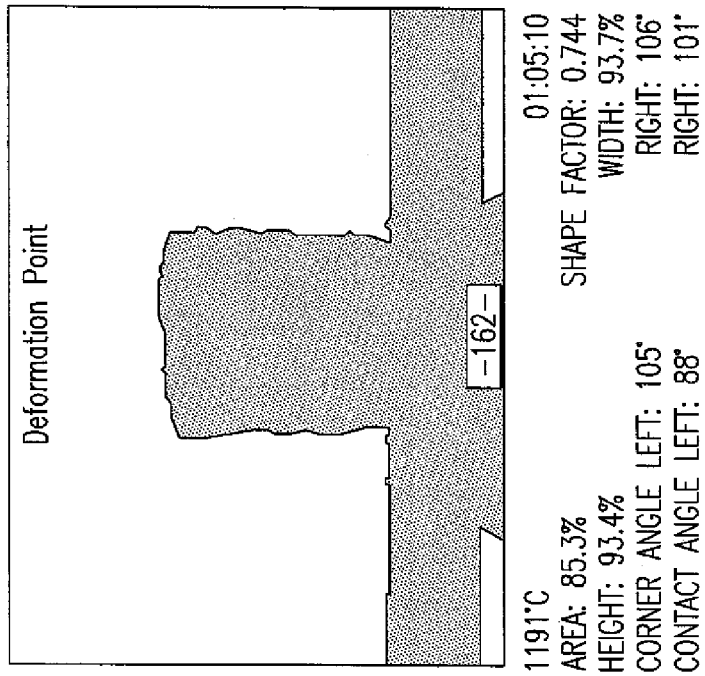
FIGS. 2A, 2B, 2C, 2D, 2E, 2F, 2G, 2H, and 2I are diagrams showing the results of an aggregate wash sample during progressive stages of a heating microscope test, from initial heating in FIG. 2A to completion at FIG. 2I.
Figure 2B:
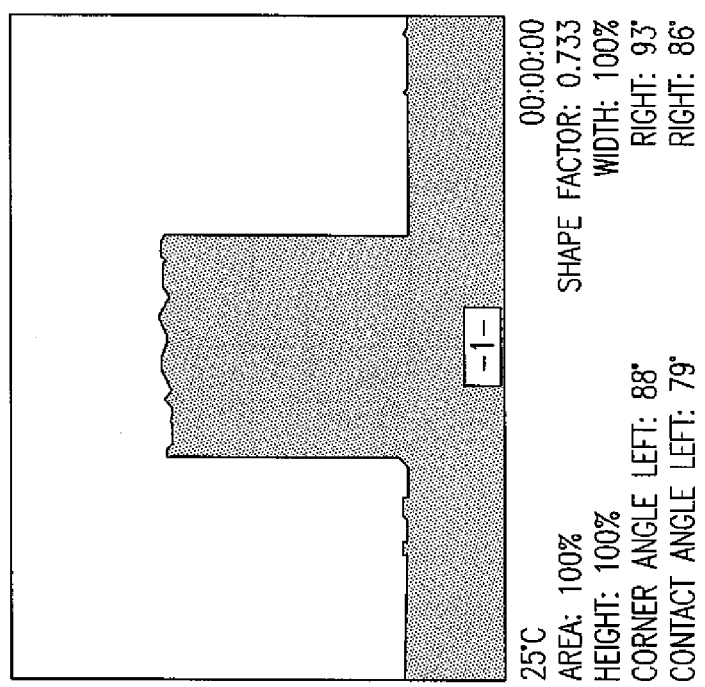
Figure 2C:
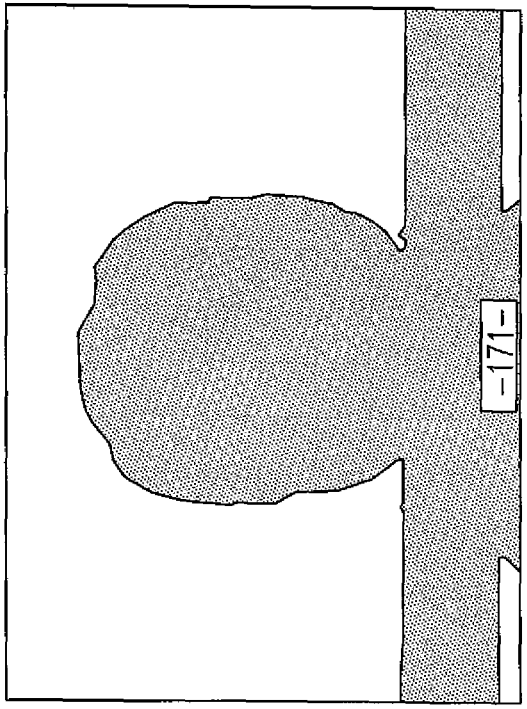
Figure 2D:
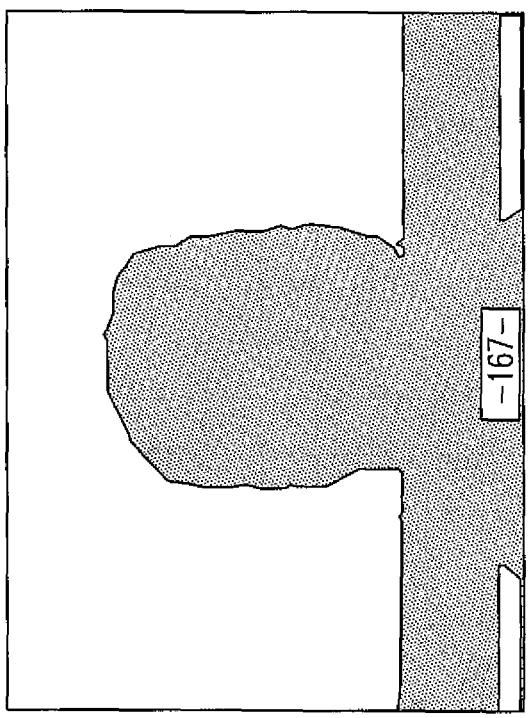
Figure 2E:
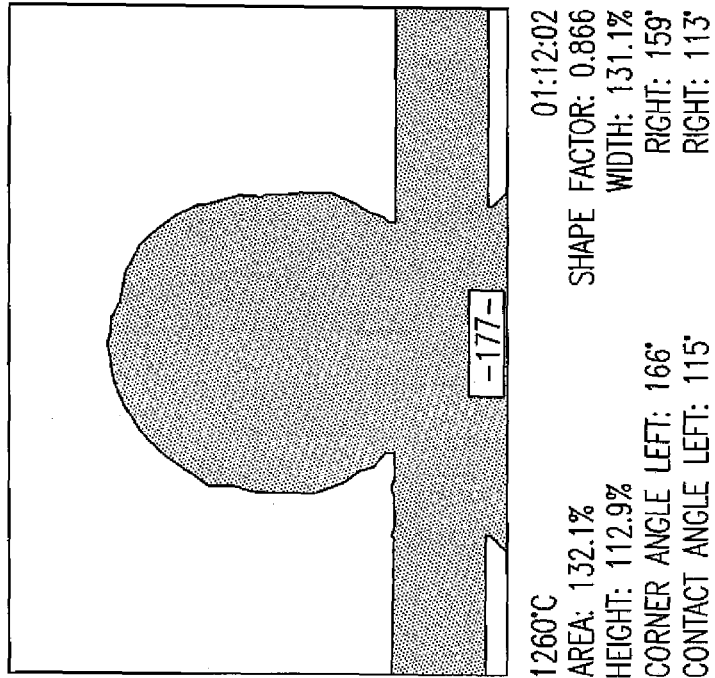
Figure 2F:
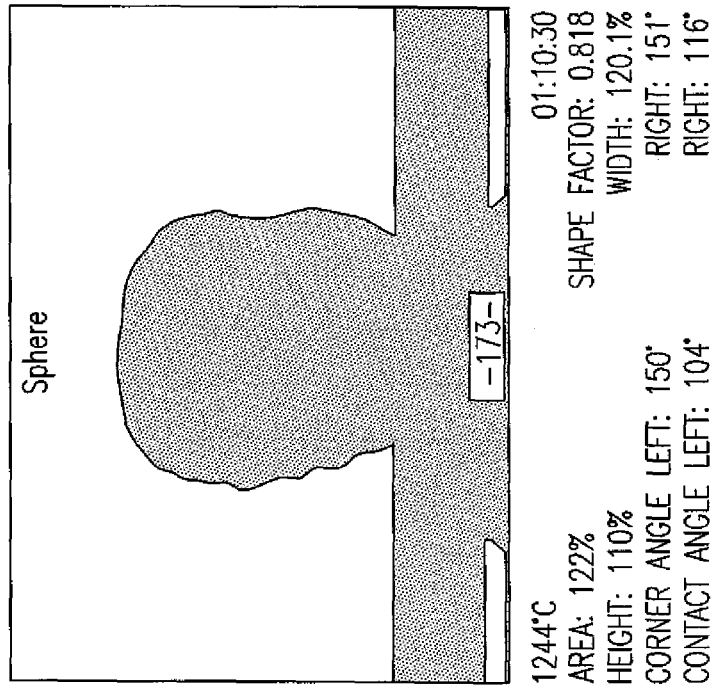
Figure 2H:
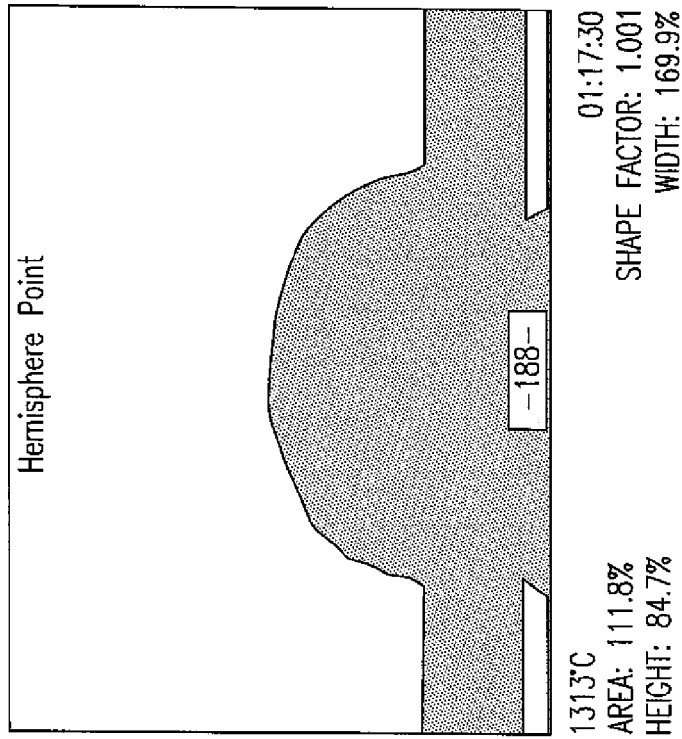
Figure 2G:
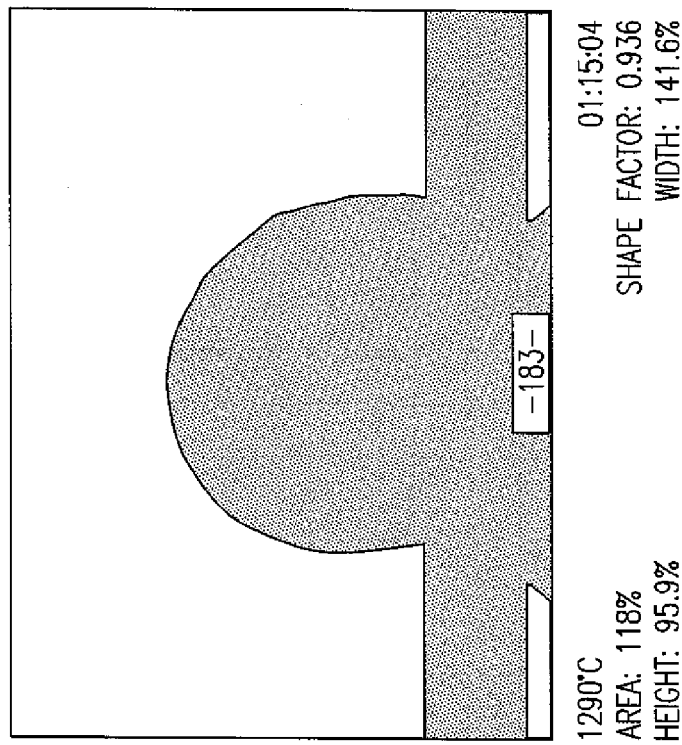
Figure 2I:
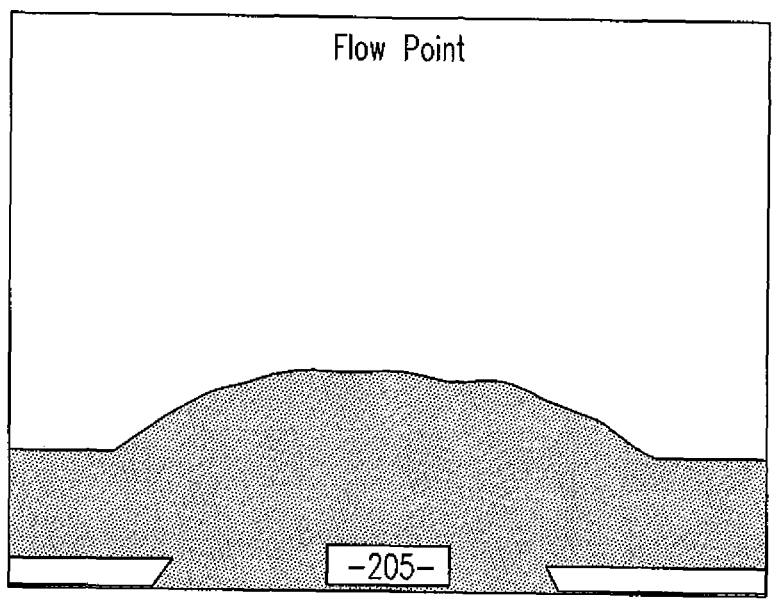

The process using multiple waste streams to manufacture synthetic lightweight aggregate produces aggregates that comply with industry standards for construction and other uses, such as insulation. The process includes providing various mixtures having at least two waste streams incorporated therein, which are then fired and cooled to form synthetic LWAs. The use of multiple waste streams to manufacture synthetic LWAs substantially reduces negative environmental impact from these waste materials that would otherwise occur if the waste were disposed in landfills, local lakes and other bodies of water, and the like. Moreover, the expenses associated with waste disposal can be substantially reduced or eliminated.

The multiple different waste streams are aggregate wash (AW) obtained as remnants from sand washing plants, sewage sludge (SS), and waste lube oil (LO). The mixture for the aggregate should contain chemical components that promote bloating during firing. It has been found that the sand wash fines from the AW contain all the necessary elements to enable the bloating and calcining processes within a commercial kiln. When exposed to high heat, the material undergoes dramatic changes, developing a hard ceramic shell and a porous core comprised of non-interconnected capillaries. An admixture of SS and/or LO produces even better results, where the SS and LO act as gas-generating and fueling agents.

The steps for producing synthetic LWA using multiple waste streams includes providing a mixture of AW and either SS or LO. The mixture is then formed into green pellets. This mixture can also be used as an additive to red clay (RC) or grey clay (GC), and green pellets can be formed from the combination. The green pellets are subjected to firing stages in which the green pellets are exposed to temperatures for calcining the composition, and then exposed to much higher temperatures where bloating occurs such that porous cavities form therein. The fired pellets are cooled to form the synthetic LWA. An example of the process using multiple waste streams to manufacture synthetic lightweight aggregate is provided below.

To determine the raw materials suitable for LWA production and to adjust their melting behavior and bloating characteristics, representative samples of raw materials and subsequent raw mixtures were subjected to chemical analysis using X-ray fluorescence (XRF). For purposes of this analysis, RC and GC were obtained from a region northeast of Kuwait City, the AW from a local sand washing plant of the National Industries Company, the SS from a local sewage treatment plant, and the LO from petrol stations around Kuwait. The presence of an appreciable $Al_2O_3$ content in any sample indicates that it is of an acceptable quality for bloating, as the approximate limit is 10 to 17% (Table 1). Also, the presence of CaO and MgO indicates that the sample consists of such materials as calcite, dolomite or magnesite, which will liberate $CO_2$ at a temperature at which a glassy phase forms. The presence of fluxes (such as $Fe_2O_3$, CaO, MgO, $K_2O$ and $Na_2O$) ensures the development of a high-temperature glassy phase of sufficient viscosity to allow for good bloatability. Red clay (RC) and green clay (GC) are included in this analysis.

TABLE 1

XRF Analysis of Raw Materials and Raw Material Mixtures (% by weight)

| Sample Designation | $SiO_2$ | $Al_2O_3$ | CaO | $Na_2O$ | MgO | $Fe_2O_3$ | $K_2O$ | $TiO_2$ | $P_2O_5$ | MnO |
|---|---|---|---|---|---|---|---|---|---|---|
| AW | 63.1 | 18.20 | 3.42 | 1.09 | 3.85 | 3.83 | 1.52 | 0.26 | 0.05 | 0.03 |
| RC | 59.2 | 20.80 | 0.50 | 3.94 | 5.43 | 6.895 | 2.91 | 0.54 | 0.28 | 0.12 |
| GC | 65.3 | 18.70 | 1.20 | 2.07 | 3.30 | 5.05 | 2.98 | 0.47 | 0.27 | 0.04 |
| 50% AW-50% RC | 60.4 | 20.00 | 1.69 | 2.07 | 4.94 | 5.75 | 2.10 | 0.42 | 0.21 | 0.08 |
| SS | 8.93 | 4.34 | 0.00 | 1.39 | 3.68 | ND* | 0.00 | 0.00 | 2.15 | 0.00 |

Referring to FIG. 1, the Riley composition diagram of major oxides shows various ranges for compositions in which favorable bloating can occur, i.e., the area encompassed by the region outlined in dotted lines. In determining the potential bloating of the materials listed in Table 1, these materials have been superimposed on the diagram. The diagram of FIG. 1 shows that these materials fall well within the range. Thus, it can be determined that due to the chemical compositions of these raw materials, they have the potential to develop the viscosity necessary for gas entrapment at their respective melting points, which, in turn, is required for bloating to occur. Hence, LWAs can be produced from these raw materials.

The bloating ranges of the raw materials and their mixtures were evaluated using a heating electron microscope in order to confirm the acceptability of their bloating characteristics by simulating a kiln heating environment on a micro scale. In the heating microscope technique, samples are heated at a temperature ranging from about 25 to 1600° C. A monitoring camera captured the images of raw materials melting at different temperatures. By this process, temperature peaks representing a variety of melting stages related to each sample can be obtained, such as the sintering temperature at which the specimen starts to shrink; the deformation temperature at which the specimen starts to soften (indicating the start of gas liberation); the sphere temperature at which gas liberation is maximum; the hemisphere temperature at which the specimen forms a hemisphere shape (indicating the end of gas liberation); and the flow point temperature, indicating the mass collapse and gas escaping from the melted structure.

Gas release takes place between the deformation and the hemisphere temperatures, which causes the material mass to bloat. Measurements collected from these results form the basis for accurately determining bloating temperatures. The plots for all of the materials and mixtures assessed indicated their ability to bloat under firing temperatures. The RC and AW samples have both exhibited maximum bloating at around 1260° C. Typical plots for AW are shown in FIGS. 2A-2I. Note that FIGS. 2B, 2E, 2H, and 2I show the measurable characteristics and shapes at the deformation point, sphere point, hemisphere point, and flow point, respectively.

Further confirmation of bloating susceptibility can be determined by actual firing trials. In this instance, prepared and dried green pellets of each material and mixture were fired in a muffle furnace at about 650° C., i.e., the calcination temperature, for about 3 minutes, then removed and placed instantly in another muffle furnace where they were subjected to bloating temperatures ranging from about 1000° C. to 1200° C., i.e., bloating temperatures. At each bloating temperature, the holding time or soaking time was maintained for about 1, 3, and 5 minute intervals before the sample was removed from the second furnace and allowed to cool.

The quality of the resulting pellets was assessed in terms of the pellets' bloating ratio, surface texture, and bulk density, which is outlined in Table 2. Generally, higher bloating ratios equate to better quality of the fired pellets. The surface texture of the fired specimens was evaluated mainly on the basis of the presence of glass melts on the specimen surface. The presence of excessive glass on the surface is undesirable in industrial production, as that can cause rings to form within a rotary kiln at high temperatures.

TABLE 2

Assessment Criteria for Evaluation of Fired Pellets

| Bloating Ratio | Assessment | Meaning |
| --- | --- | --- |
| 1.6-2.0 | Excellent | Thin reddish brown oxidized mat skin layer |
| 1.4-1.6 | Very Good | |
| 1.2-1.4 | Good | Dark brown oxidized skin layer with slightly glossy appearance |
| 1.0-1.2 | Fair | |
| 1.0 | Poor | Grey-greenish or dark grayish skin layer with very glossy appearance, cracks and burst |

After completing the firing of the green pellets, according to the procedure described above, a bloatability assessment was carried out for each batch of fired pellets. Bloating has been defined as the ratio of the diameter of the fired product to the diameter of the unfired pellet. The quality of the finished products was assessed in terms of bloating ratio, surface texture, specific gravity and bulk density. The data for a typical bloating assessment following the above procedure includes the firing temperature, holding time, bloating ratio, pellet diameter size, density, and mixture composition.

Based upon the results of the assessment of the firing trials, a materials selection was made in accordance with their respective performance with respect to firing temperatures, calcination, and bloating holding time stages. The firing trials indicated that AW and RC were promising raw materials for synthetic aggregate production. The effect was more profound in clay samples containing LO and SS as bloating additives. Nevertheless, due to the difficulty in accessing the clay reserves in arid regions, such as the desert, relying on natural clay sources alone would be impractical. Therefore, AW waste materials were determined to be the most suitable and most reliable sustainable source of raw materials for the production of synthetic aggregate, in combination with natural RC and other additives, such as LO and SS. For the pilot production, the following were considered: (1) AW without LO calcined at about 650° C. for 5 min and fired at about 1200° C. for about 15 min; (2) AW with about 1.12% LO calcined at about 650° C. for about 5 min and fired at about 1200° C. for about 15 min; 50% AW and 50% RC or even mixture of AW and RC with about 1.12% LO calcined at about 650° C. for about 5 min and fired at about 1200° C. for about 15 min; AW with about 4% SS calcined at about 650° C. for about 5 min and fired at about 1200° C. for about 15 min.

Production of lightweight expanded clay aggregate (LECA) on a pilot-plant scale started with green-pellet production of every selected mixture combination, as optimized previously. Raw materials were stockpiled, dried, crushed, and powdered. Then, the powdered materials were liquefied, screened, press-filtered to reduce moisture, extruded into strands, and pelletized into green pellets. The green pellets were then dried and conditioned, in preparation for rotary kiln firing.

Firing was performed in stages. The first stage or calcination stage included firing the green pellets at about 650° C. for about 3 to 6 min. The second stage or bloating stage subjected the calcined pellets from the first stage to a temperature of about 1200° C. for about 10 to 20 min. As the materials pass through the kiln, the above firing or heating can be characterized as facilitating the following processes in general sequence: mechanical moisture or drying period, hygroscopic or colloidal water dehydration period, chemical or molecular water dehydration period, oxidation period, dissociation-reduction period, vitrification period (which involves initial glass formation melting), and pyroplastic conditioning (which is a period of bloating for clays so that all of the gases present in the material can be completely liberated, sealed and entrapped within the bloated pellet). Firing was performed with graduated increases of temperature to avoid thermal shocks, which can cause pellets to shatter into small pieces. A pilot plant at the Kuwait Institute for Scientific Research (KISR) was used to produce the LWAs listed in Table 3.

TABLE 3

Details of the Tested KISR-LWAs

| Aggregate No. | Mix Details |
| --- | --- |
| 1 | AW-LO (1.12%) |
| 2 | 50AW-50RC-LO (1.12%) |
| 3 | AW-SS (4%) |
| 4 | AW |

As Table 3 shows, Aggregate No. 1 includes a mix of AW and about 1.12% by weight of LO. Aggregate No. 2 includes an equal mix of AW and RC with about 1.12% by weight of LO additive. Aggregate No. 3 includes a mix of AW and about 4% by weight of SS. Aggregate No. 4 is a standalone mix of AW. For purposes of discussion, the LWAs produced at KISR will be designated as KISR-LWAs. Additionally, the specific aggregate number can also be referred to as "aggregate type" or "type" followed by a numerical designation consistent with those set forth in Table 3.

Performance of concrete specimens containing KISR-LWA were prepared and evaluated against the performance of concrete specimens containing commercial LWA. The categories of evaluation include shrinkage, compressive strength, thermal conductivity, density and absorption. Table 4 shows the standards and the size of concrete specimens used for each category.

TABLE 4

Concrete Tests and Concrete Specimen Size

| Test | Standard Test Method | Concrete Specimen Size |
| --- | --- | --- |
| Shrinkage | ASTM C331-05 & C157 (2005) | 50 mm × 50 mm × 285 mm |
| Density and Water Absorption | BS 1881-122 (1983) & BS 1881-115 (1983) | 300 mm × 300 mm × 50 mm |
| Compressive Strength | ASTM C39 (2005) | 100 mm ø × 200 mm |
| Thermal Conductivity | ASTM C518 (2002) | 300 mm × 300 mm × 50 mm |

The concrete mixes were prepared using one part Portland cement to six parts combined aggregate, measured in loose dry volume. The water content was adjusted to produce a slump of about 50 to 75 mm (2 to 3 in). Different sizes of concrete specimens were produced and tested.

The drying shrinkage results for concrete specimens made using fired LWA and commercial LWA are presented in Table 5. Drying shrinkage should not exceed 0.10%, as specified in ASTM C331-05 (2005). No samples showed drying shrinkage that exceeded 0.10%. The samples containing commercial LWA showed similar results to the concrete specimens containing fired KISR-LWA.

TABLE 5

Drying Shrinkage Results for Concrete Specimens Containing LWA

| Mix Using | Drying Shrinkage (%) | |
| --- | --- | --- |
| Aggregate Type | 7 days | 28 days |
| 1 | 0.02 | 0.09 |
| 2 | 0.04 | 0.08 |
| 3 | 0.03 | 0.10 |
| 4 | 0.03 | 0.06 |
| Commercial | 0.01 | 0.09 |

The density and water absorption of hardened concrete samples were evaluated, and the results are tabulated below in Table 6. The density of the concrete produced using KISR-LWA ranged between about 1342 and 1584 kg/m³. Concrete samples containing Aggregate No. 2 produced the lightest concrete, while concrete samples containing Aggregate No. 4 had the lowest water absorption value of about 13.3%. Concrete produced using commercial LWA showed comparable results to the concrete specimens made using KISR-LWA.

The thermal conductivity of the concrete samples was evaluated by measurements of steady-state thermal transmission using a heat flow meter apparatus. The K-value expressed in (W/m K) was measured, and the results are also presented below in Table 6. No measurable difference was noticed among the K-values of the concrete samples produced using various KISR-LWA, i.e., between about 0.45 and 0.55. The commercial LWA concrete samples had comparable K-values to the KISR-LWA concrete. Concrete using Aggregate No. 3 is particularly close to the commercial LWA concrete. The thermal conductivity of KISR-LWA, concrete was comparable to that of other conventional insulation materials used in building walls and roofs, which makes the same an economically competitive alternative insulation material.

A 28-day compressive strength evaluation is also presented below in Table 6. Although compressive strength is not a crucial property, it is, however, an indication of the minimum strength required for handling and transport of stockpiled blocks. The results showed no noticeable deviation in the compressive strength of the concrete mixes produced using the four types of KISR-LWA concrete. The average 28-day compressive strength values ranged between about 7 and 12 MPa, with the highest value attributed to concrete made using Aggregate No. 4. All of the concrete mixes produced using the four types of KISR-LWA showed comparable values of compressive strength to the commercial LWA concrete samples.

TABLE 6

Density, Water Absorption, Thermal Conductivity and Compressive Strength of Concrete Specimens Containing LWA

| Parameter | Mix Containing LWA Type | | | | |
| --- | --- | --- | --- | --- | --- |
| | 1 | 2 | 3 | 4 | Commercial |
| Density (kg/m³) | 1419 | 1342 | 1536 | 1584 | 1520 |
| Water Absorption (%) | 18.5 | 17.4 | 17.5 | 13.3 | 14.65 |
| K-Value (W/m K) | 0.50 | 0.48 | 0.55 | 0.45 | 0.62 |
| 28 day Compressive Strength (MPa) | 8.58 | 7.59 | 9.43 | 12.75 | 10.48 |

From the above, it can be seen that LWA produced by the process using multiple waste streams has material characteristics comparable to commercial LWA. These synthetic LWAs satisfy industrial standards for general construction use, as well as for insulation. This demonstrates that synthetic LWA produced by the above process is a successful alternative source of LWA. Moreover, AW has been determined to be a more reliable and suitable source of raw material for producing LWA, especially in combination with other additives, such as LO and SS, as well as natural clays. Furthermore, the utilization of these multiple waste streams in producing synthetic LWA would minimize the environmental impact of waste material disposal.

It is to be understood that the present invention is not limited to the embodiments described above, but encompasses any and all embodiments within the scope of the following claims.

We claim:

1. A process for using multiple waste streams to manufacture synthetic lightweight aggregate comprising:
   providing multiple waste streams consisting essentially of aggregate wash from sand washing plants and waste lube oil;
   mixing the aggregate wash and waste lube oil to form a mixture having at least about 50% aggregate wash by weight and 1.12% lube oil by weight;
   forming a plurality of pellets from the mixture;
   calcining the pellets;
   firing the plurality of calcined pellets at a temperature and time sufficient for bloating of the calcined pellets; and
   cooling the pellets to form a lightweight low density synthetic aggregates with a bulk density of 0.88 to 1.12 g/cm³.

2. The process of using multiple waste streams to manufacture synthetic lightweight aggregates according to claim 1, wherein the step of calcining the pellets comprises heating the pellets at about 650° C. for about 3 to 6 minutes.

3. The process of using multiple waste streams to manufacture synthetic lightweight aggregates according to claim 1, wherein the pellets are calcined at about 1000° C. to 1200° C. for about 10 to 20 minutes.

4. The process of using multiple waste streams to manufacture synthetic lightweight aggregates according to claim 1, further comprising the step of adding clay to the mixture to form another mixture for subsequent pelletizing and firing.

5. The process of using multiple waste streams to manufacture synthetic lightweight aggregates according to claim 4, wherein the clay comprises the balance of the mixture by weight.

6. A process for using multiple waste streams to manufacture synthetic lightweight aggregate comprising:
providing multiple waste streams consisting essentially of aggregate wash from sand washing plants and sewage sludge;
mixing the aggregate wash and sewage sludge to form a mixture, the mixture having at least about 50% aggregate wash by weight and about 4% sewage sludge by weight;
forming a plurality of pellets from the mixture;
calcining the pellets;
firing the plurality of calcined pellets at a temperature and a time sufficient for bloating of the calcined pellets; and
cooling the pellets to form lightweight low density synthetic aggregates with a bulk density of 0.88 to 1.12 g/cm$^3$.

7. The process of using multiple waste streams to manufacture synthetic lightweight aggregates according to claim 6, wherein the step of calcining the pellets comprises heating the pellets at about 650° C. for about 3 to 6 minutes.

8. The process of using multiple waste streams to manufacture synthetic lightweight aggregates according to claim 6, wherein the pellets are calcined at about 1000° C. to 1200° C. for about 10 to 20 minutes.

9. The process of using multiple waste streams to manufacture synthetic lightweight aggregates according to claim 6, further comprising the step of adding clay to the mixture to from another mixture for subsequent pelletizing and firing.

10. The process of using multiple waste streams to manufacture synthetic lightweight aggregates according to claim 9, wherein the clay comprises the balance of the mixture by weight.

11. A lightweight synthetic aggregate for use in masonry and insulation comprising a composite material of at least 50% aggregate wash from sand washing plants by weight and at least one waste material selected from the group consisting of 4% sewage sludge by weight and about 1.12% lube oil by weight, wherein the bulk density of the lightweight synthetic aggregate is 0.88 to 1.12 g/cm$^3$.

12. The lightweight synthetic aggregate according to claim 11, wherein the composite material is at least about 50% aggregate wash by weight and about 4% sewage sludge by weight.

13. The lightweight synthetic aggregate according to claim 11, wherein the composite material is at least 50% aggregate wash by weight and about 1.12% lube oil by weight.

14. The lightweight synthetic aggregate according to claim 11, wherein the composite material further comprises clay about equal in weight to the aggregate wash material.

15. The lightweight synthetic aggregate according to claim 14, wherein the clay is red clay.

16. A concrete made from the lightweight synthetic aggregate of claim 11.

* * * * *